(12) United States Patent
Duvall

(10) Patent No.: US 6,665,613 B2
(45) Date of Patent: Dec. 16, 2003

(54) METHOD OF AND APPARATUS FOR DYNAMICALLY GOEFENCING MOVABLE VEHICLE AND OTHER EQUIPMENT AND THE LIKE

(75) Inventor: William Duvall, Sudbury, MA (US)

(73) Assignee: LoJack Corporation, Westwood, MA (US)

( * ) Notice: Subject to any disclaimer, the term of this patent is extended or adjusted under 35 U.S.C. 154(b) by 155 days.

(21) Appl. No.: 09/962,956

(22) Filed: Sep. 25, 2001

(65) Prior Publication Data

US 2003/0060938 A1 Mar. 27, 2003

(51) Int. Cl.$^7$ .............................................. G01C 21/36
(52) U.S. Cl. ...................................................... 701/213
(58) Field of Search ................................ 701/213, 214; 342/357.01, 357.07; 455/456

(56) References Cited

U.S. PATENT DOCUMENTS

| | | | | |
|---|---|---|---|---|
| 5,731,785 A | * | 3/1998 | Lemelson et al. | 342/357.07 |
| 6,480,147 B2 | * | 11/2002 | Durst et al. | 342/357.07 |
| 2002/0193121 A1 | * | 12/2002 | Nowak et al. | 455/456 |

* cited by examiner

Primary Examiner—Marthe Y. Marc-Coleman
(74) Attorney, Agent, or Firm—Rines and Rines

(57) ABSTRACT

A technique and apparatus for dynamically establishing and varying GeoFencing of a GPS-processor equipped vehicle or the like by providing specialized software and firmware at the vehicle processor to enable internal calculation of shape and size of GeoFences about the vehicle upon commands of the control center station, and without the necessity for such calculation or data point information transmission from the station.

17 Claims, 4 Drawing Sheets

Figure 1:
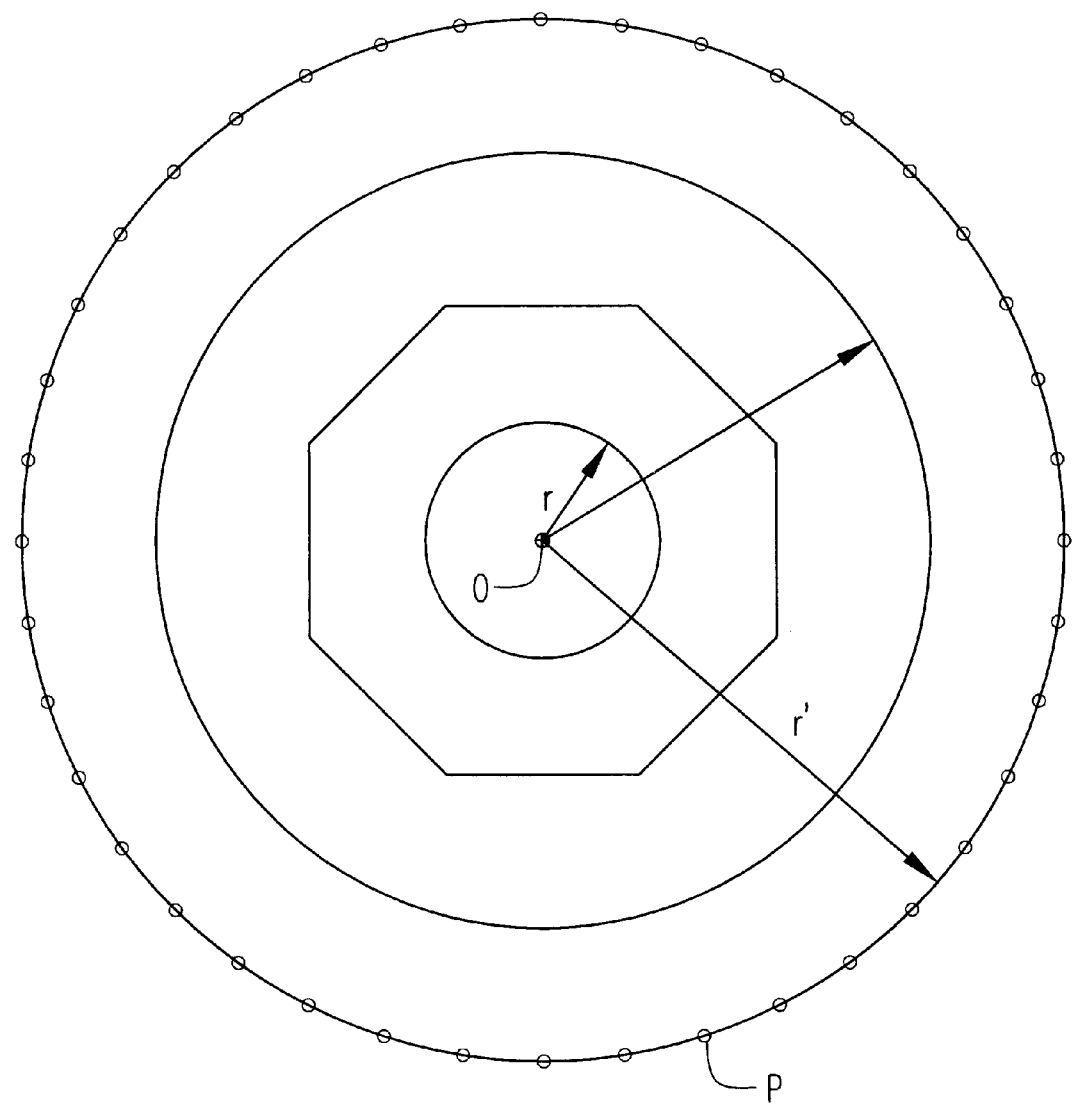

METHOD OF AND APPARATUS FOR DYNAMICALLY GOEFENCING MOVABLE VEHICLE AND OTHER EQUIPMENT AND THE LIKE

FIELD

The present invention relates to the field of GeoFencing—the concept of providing information that indicates through GPS signal fixing at, and of, a vehicle or other apparatus or system receiving its GPS location or address, that the vehicle or the like has not strayed beyond some predetermined area surrounding that location—the so-called GeoFence established around an original address or location of the vehicle or the like.

BACKGROUND

As described, for example, at Qualcam website, Air IQ website, and Highway Master website, as illustrations, the prior art of such GeoFencing requires either the entry via send-port or other physical interface or the day-to-day downloading at the vehicle of data points for establishing the parameters of the fence to be established around the vehicle origin location, to be transmitted from an outside source such as a remote central server station, generally over an air interface such as the cellular telephone networks. In accordance with existing methods, hardware is installed in the vehicle, such hardware consisting of a GPS receiver, processor/memory, and firmware, and power supply. The variations of the GeoFence can be applied once the latitude and longitude is determined by the hardware and the location is registered at the central station, which then transmits data points for the setting of the desired GeoFence area, for downloading at the vehicle to define the desired GeoFence latitude and longitude parameters. If the vehicle is unauthorizedly driven out of the established GeoFence, it is possible then to cause an alarm to be sent over a radio or telephone channel to provide notification that the vehicle has been so moved. Alternatively, if the vehicle, such as construction equipment or the like, is to be located at a different site, a new GPS origin location is received at the new site by the vehicle and is registered at the central station, and new sets of data points are transmitted from the station to the vehicle or apparatus to set up a new GeoFence; or to expand or contract a GeoFence, all as desired. The fence parameters may change because the position of the vehicle itself may be moved from town to town, requiring changed origin points; or the size of the GeoFence may be varied, altering the radius from, say, one mile to two miles. A delivery vehicle, for example, may choose to expand the area of its delivery van from just one city to neighboring cities.

The before-described present-day transmission of GeoFence data to be downloaded at the vehicle requires considerable bandwidth in the communications network to enable downloading all of the new latitude-longitudinal information to establish the GeoFence, requiring considerable air time to do so and intensive messaging, or requires direct input via a physical interface to the hardware. Extensive messaging is required, indeed, to get enough data into the vehicle hardware to establish a new GeoFence.

These difficulties are alleviated in accordance with the technique of the present invention by building the capability of establishing the new GeoFence within the firmware product in the vehicle itself, and requiring only commands from the central station to set up the new GeoFence—totally eliminating the present-day need for transmitting data from the station and re-loading such new data points into the vehicle resident hardware.

As an illustration, it may be desired to move a piece of construction equipment, say, a steam shovel, to a new location. Once the vehicle is moved, the central station sends a command to it to determine the new home origin location points or address by its GPS equipment and to register the new location with the station. A subsequent command will activate the algorithm provided in accordance with the invention within the firmware of the vehicle processing equipment to calculate within the unit itself, the new data points for the selected GeoFence—say a circle of 2-mile radius about the new origin location. This totally eliminates the requirement for the station to send the new fence data, since the vehicle unit itself now calculates the new GeoFence parameters dynamically within itself.

At the time of manufacture of the vehicle processing unit, the characteristics of the GeoFence are, or can be, pre-established—whether it will be a circle, or a square, or a polygon such as a hexagon or an octagon approximating a circle. Once determined, the unit software will, in operation, generate the new latitude and longitude points for the perimeter of the GeoFence about the home origin point or address.

OBJECTS OF INVENTION

The primary object of the invention, thus, is to provide a new and improved method of and apparatus for GeoFencing that shall not be subject to the prior art and present-day disadvantages above described; but that, to the contrary, enable dynamic GeoFence establishment at the vehicle itself upon command from a remote central or control station.

Other and further objects will be explained hereinafter and are more particularly delineated in the appended claims.

SUMMARY

In summary, however, from one of its broadest viewpoints, the invention embraces a method of controlling from a remote control center the dynamic GeoFencing of a vehicle or other movable apparatus internally provided with a GPS receiver, a software-implemented processor, and communication links, that comprises, transmitting a command from said control center to the vehicle to receive and transmit to the control center, its current GPS location point; pre-determining at the control center the desired shape and size of a GeoFence around the vehicle and transmitting commands to the vehicle to establish such a GeoFence; and responding at the processor to said commands by operating said software to calculate in the processor the location of points defining the perimeter of said desired shape and size of GeoFence, thereby establishing the desired GeoFence about the current vehicle location point from data calculated at said vehicle processor.

Preferred and best mode embodiments and designs are later detailed.

DRAWINGS

Figure 2:
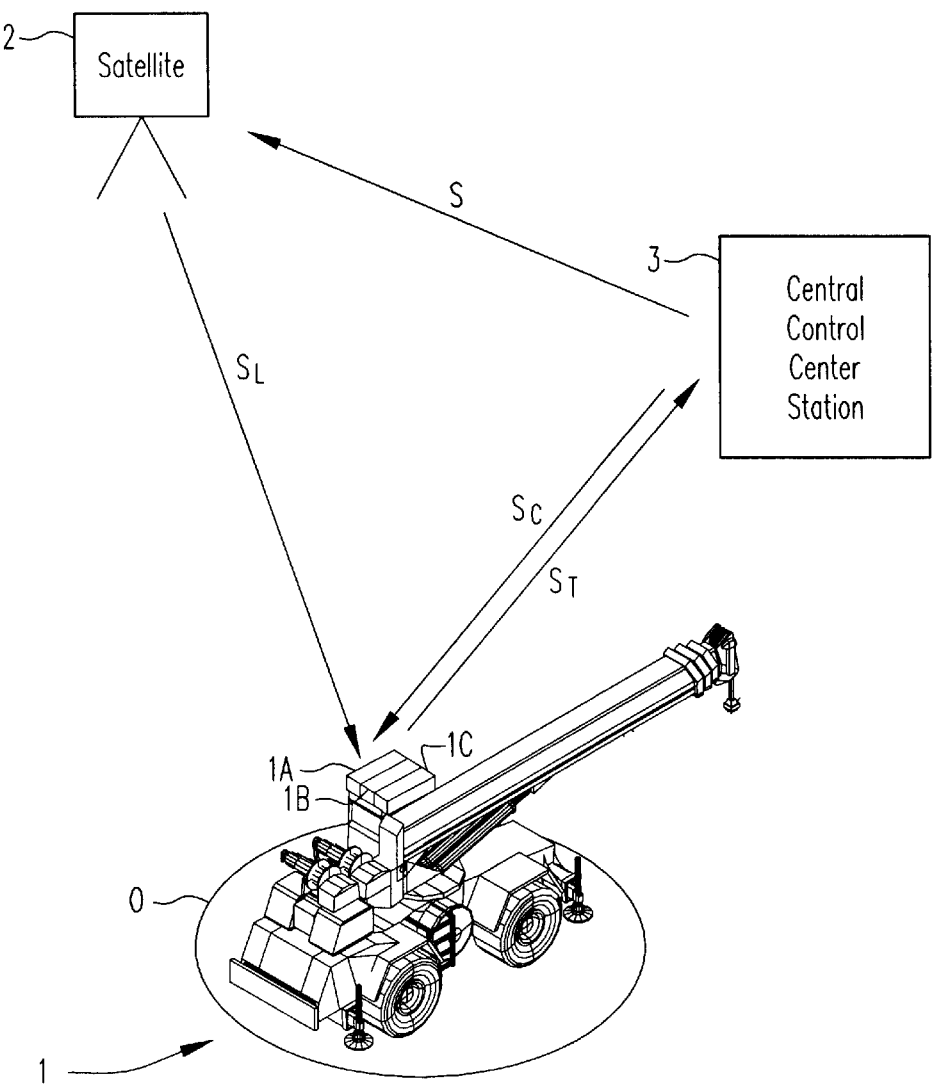
Figure 3:
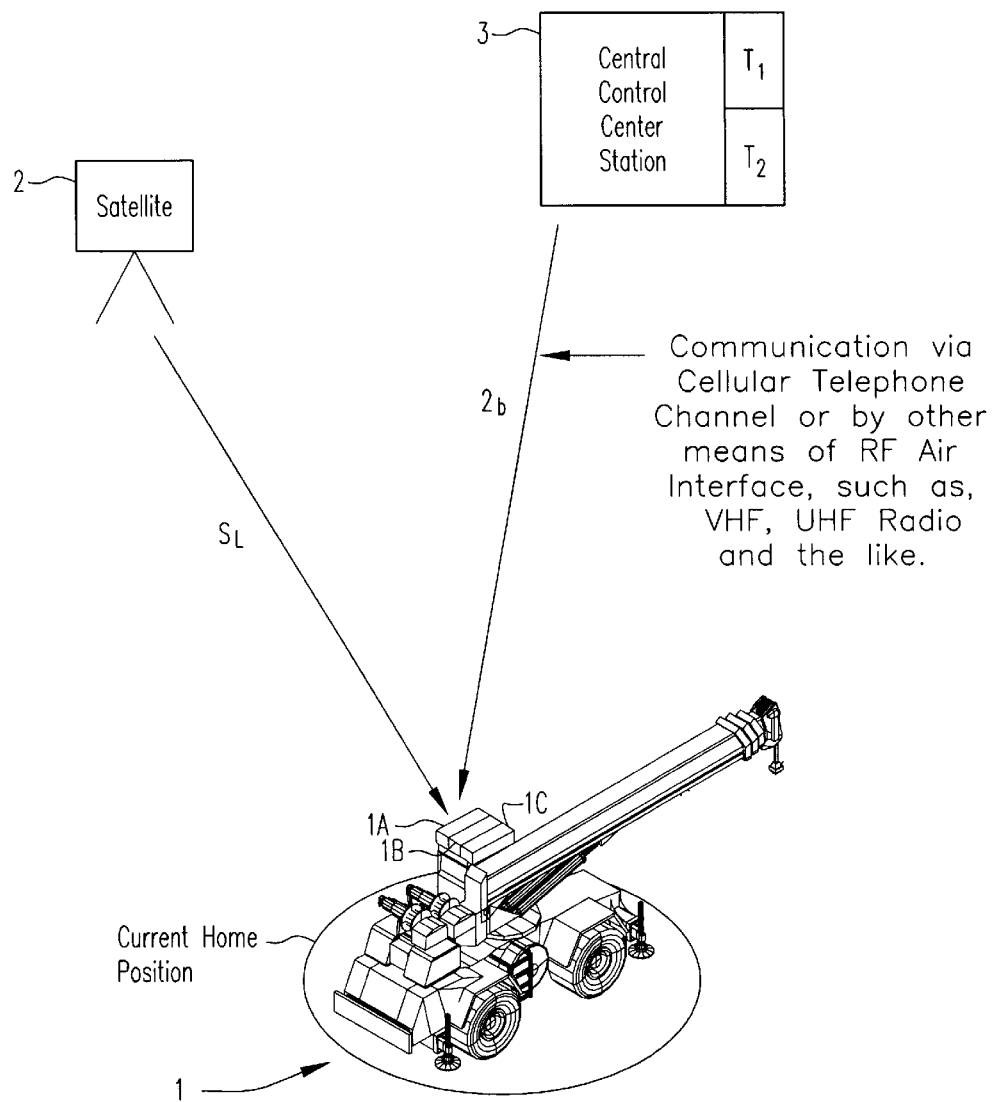
Figure 4:
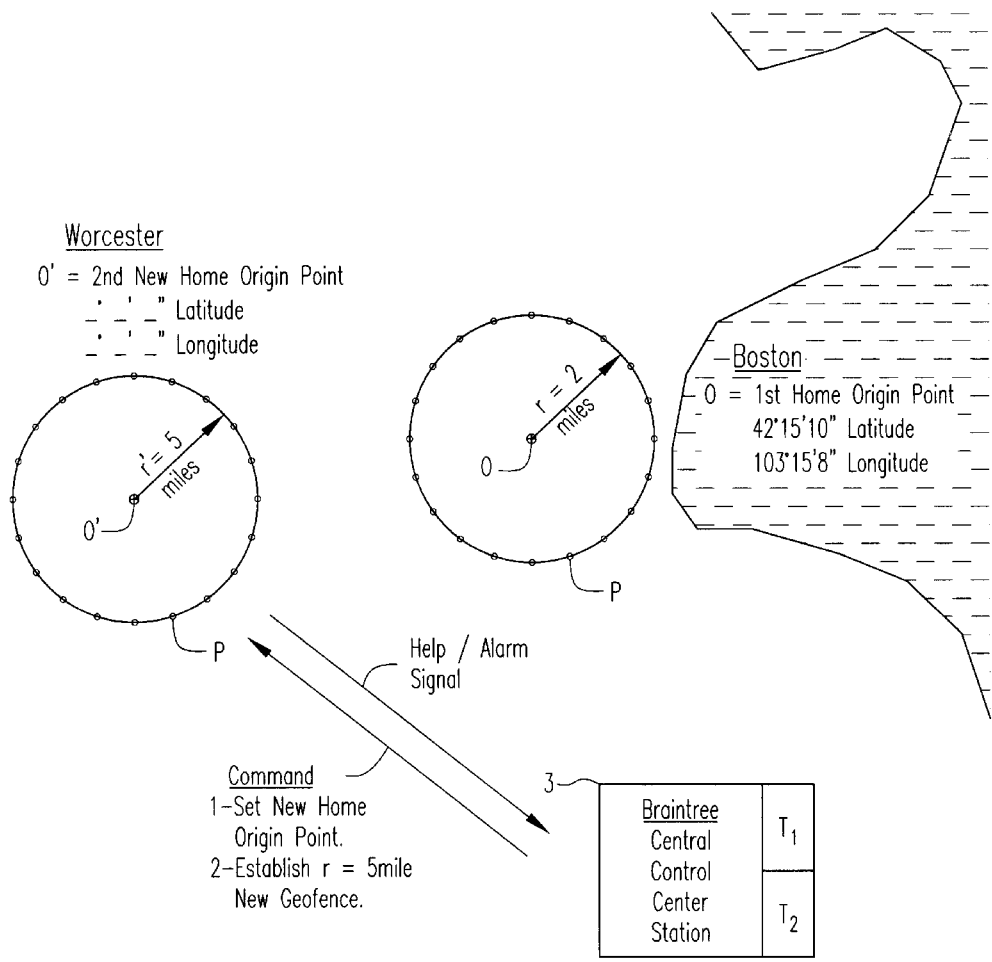

The invention will now be explained in connection with the accompanying drawings, FIG. 1 of which is an explanatory diagram of different GeoFence areas;

FIGS. 2 and 3 are system diagrams showing the inter-relation of vehicles (or the like) to-be-monitored and GPS satellite navigation signaling and control center links used in accordance with the invention; and FIG. 4 is a diagram of changed site and remote control station interaction.

DESCRIPTION OF PREFERRED EMBODIMENT(S) OF INVENTION

Referring to FIG. 1, a plurality of different-area GeoFence geometric shapes are shown established around a central vehicle origin location O—as, for example, of circular or polygonic shape. The data points P for establishing the perimeter are, in accordance with the technique underlying the present invention, as later detailed, computed by the processor within the vehicle at O on external command, once the vehicle GPS receiver has identified its origin location. The size of the GeoFence is varied by changing the radius or effective radius r, r' for the GeoFence, by command.

A vehicle 1 is shown in the form of a crane for illustrative purposes in FIG. 2, equipped with a GPS receiver 1A for receiving navigation position-location signals $S_L$ from the GPS constellation 2, a processor 1B, and a communication modem or link 1C for communicating along $S_T$ and receiving along $S_C$ to and from a central control center station 3. The control center station, FIGS. 2 and 3, communicates along $S_C$ with commands, later explained, for the control of the software-programmed processor 1B, and also may request the GPS satellite 2 (S, FIG. 2) and/or the GPS vehicle receiver 1A, to signal the longitude-latitude current position coordinates for the current location O of the vehicle 1 as is well known. The vehicle 1 will provide along $S_T$ the current (or new) location information received at the vehicle from the satellite, to the central station 3 for registration thereat. Upon such command $S_C$ from the central control station 3, the vehicle 1 therefore identifies its current (new) location or site.

At the control center, a decision is made to establish a desired, or to change a GeoFence around the vehicle at its identified current (new) location, and a command signal $S_C$ is sent to the vehicle to establish a new GeoFence and also, preferably simultaneously, to designate what new parameters for the GeoFence the vehicle processor 1B is to calculate.

Upon receipt at the vehicle unit of such commands, the vehicle processor 13 calculates by its internal software and firmware such new GeoFence parameters selected by the control center station. The new parameters are selectable after the vehicle determination from the GPS satellite of its current home position, through the well-known use of numbered tables—a first for selection of a particular geometric pattern or shape (circular, polygon, etc.) from a fence shape numbered table $T_1$, FIG. 2, and then for selection of the size of the shape from a second pre-prepared numbered table $T_2$—for example, the selection of a circular fence and the selection of a radius, say, of 2 miles from the control center. Such communications may be effected via a cellular telephone channel or by other radio air link interfaces as by VHF, UHF and the like, including the Lojack "One Phone" and "Location" systems described in copending U.S. patent applications, Ser. Nos., 09/235,606, filed Jan. 20, 1999 and 09/662,278, filed Sep. 14, 2000 and 09/194,242, filed Nov. 25, 1998.

The internal firmware-software at the vehicle, by well-known types of implementation, itself thus calculates and establishes the GeoFence and desired changes therein without the necessity for the supplying of data from the control center as is presently done, though subject to the above-described and other disadvantages, all overcome by the dynamic GeoFencing concept of the present invention.

An example of the use of the invention is shown in FIG. 4 where a first established GeoFence of an exemplary two-mile radius has been set up (far right) for a vehicle at Origin O in Boston. The vehicle is then moved to Worchester (0') and a five mile radius GeoFence is set up with the longitude-latitude data points P defining the circular fence calculated internally by the vehicle processor upon command of the remote central control station at Braintree, as earlier described. A supplemental "help" or alarm signal is also illustrated as sent to the station in an emergency or in the event the vehicle has been unauthorizedly moved outside the established GeoFence.

Further modifications will occur to those skilled in this art and such are considered to fall within the spirit and scope of the present invention as defined in the appended claims.

What is claimed is:

1. A method of controlling by transmitted radio commands from a remote control center the dynamic GeoFencing of a vehicle or other movable apparatus internally provided with a GPS receiver, software-implemented processor, and communication links, that comprises, transmitting a first command from said control center to the vehicle to receive and transmit to the control center, the current GPS location point of the vehicle; pre-determining at the control center the desired shape and size of a GeoFence around the vehicle and transmitting further commands to the vehicle to establish such a control-center pre-determined GeoFence; and responding at the processor to said further commands by operating said software to calculate in the processor the location of points defining the perimeter of said control-center pre-determined desired shape and size of GeoFence, thereby establishing the desired GeoFence about the current vehicle location point from data calculated at said vehicle processor.

2. The method of claim 1 wherein the GPS location point and the GeoFence perimeter points are expressed as latitude and longitude numbers.

3. The method of claim 2 wherein said shape is selected as one of substantially circular and polygonic shapes.

4. The method of claim 3 wherein the polygonic shape is formed of sufficient location data points to approximate a circle.

5. The method of claim 4 wherein, having established a GeoFence, the control center commands the vehicle processor to vary the radius or effective radius of the GeoFence, thereby correspondingly to vary the included area.

6. The method of claim 2 wherein both the control center and the vehicle processor software are provided with lookup tables for the respective selection and data calculation implementation of one or both of said shape and size of the GeoFence.

7. The method of claim 2 wherein the vehicle initiates its current GPS location reading and transmits it to the control center.

8. The method of claim 2 wherein the control center initiates the activating of a GPS reading at the vehicle and such reading is communicated by the vehicle to the control center.

9. Apparatus for controlling by transmitted radio commands from a remote control center the dynamic GeoFencing of a vehicle or other movable apparatus internally provided with a GPS receiver, a software-implemented processor, and communication links, having, in combination, means for transmitting a first command from said control center to the vehicle to receive the current GPS location point of the vehicle and transmit the same to the control center; means for pre-determining at the control center the desired shape and size of a GeoFence around the vehicle; means for transmitting further commands from the control center to the vehicle to establish such a control-center pre-determined GeoFence; and software at the processor responsive to said further commands for calculating the location of points defining the perimeter of said control-center pre-determined desired GeoFence about the current vehicle location point from data calculated at said vehicle processor.

10. The apparatus of claim 9 wherein the GPS location point and the GeoFence perimeter points are expressed as latitude and longitude numbers.

11. The apparatus of claim 10 wherein said shape is selected as one of substantially circular and polygonic shapes.

12. The apparatus of claim 11 wherein the polygonic shape is formed of sufficient location data points to approximate a circle.

13. The apparatus of claim 12 wherein, having established a GeoFence, the control center is provided with means for commanding the vehicle processor to vary the radius or "effective" radius of the GeoFence, thereby correspondingly to vary the included area.

14. The apparatus of claim 10 wherein both the control center and the vehicle processor software are provided with look-up tables for the respective selection and data calculation implementation of one or both of said shape and size of the GeoFence.

15. The apparatus of claim 10 wherein the vehicle is provided with means for initiating a current GPS location reading and transmitting it to the control center.

16. The apparatus of claim 10 wherein the control center is provided with means for initiating the activating of a GPS reading at the vehicle, and the vehicle is provided with means for thereupon communicating said reading to the control center.

17. A method of controlling by transmitted radio commands from a remote control center the movement and dynamic GeoFencing of a vehicle or other movable apparatus internally provided with a GPS receiver, software-implemented processor, and communication links, that comprises, instructing the vehicle from the control center to assume a new location site;

transmitting a first command from said control center to the vehicle to identify arrival at each new location site by receiving at the vehicle the vehicle current GPS location point and transmitting the same to the control center;

pre-determining at the control center the desired shape and size of a Geo Fence around the new location site and transmitting further commands from the control center to the vehicle to establish such a control-center pre-determined Geo Fence; and responding at the vehicle processor to said further commands by operating said software to calculate in the processor the location of points defining the perimeter of said control-center pre-determined shape and size of Geo Fence, thereby establishing the same about the current vehicle location point from data calculated at said vehicle processor.

* * * * *